United States Patent Office 3,183,251
Patented May 11, 1965

3,183,251
BIS(AZIDODIARYLPHOSPHINE) DECABORANES AND A PROCESS FOR THEIR PREPARATION
Thomas A. Knowles, Hamden, and Hansjuergen A. Schroeder, New Haven, Conn., assignors to Olin Mathieson Chemical Corporation, a corporation of Virginia
No Drawing. Filed July 23, 1962, Ser. No. 211,823
13 Claims. (Cl. 260—349)

This invention relates to novel phosphorus-containing derivatives of decaborane. More particularly, this invention relates to bis(azidodiarylphosphine) decaboranes and to a method for their preparation.

The novel phosphorus-containing derivatives of this invention have the general formula:

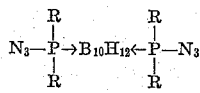

wherein R is an aryl radical selected from the group consisting of phenyl, tolyl, xylyl, naphthyl, or biphenyl and alkyl-substituted derivatives of these same aryl radicals. Preparation of the novel compounds of this invention is acomplished by reacting a bis(halodiarylphosphine) decaborane with an alkali metal azide. The reaction is carried out while the reactants are dispersed in an inert, organic liquid. Suitable inert organic liquids include, for example, monohydric alcohols of the formula:

wherein R' is an alkyl group having from 1 to 8 carbon atoms, and nitriles of the formula:

wherein R'' is an alkyl group having from 1 to 5 carbon atoms.

The reaction proceeds as shown in the following equation:

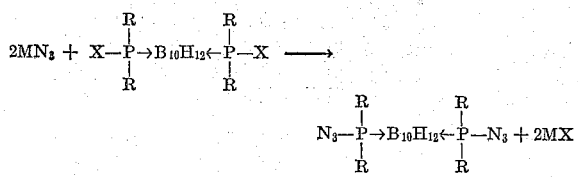

wherein M is an alkali metal selected from the group consisting of sodium, potassium or lithium, X is a halogen, and R is an aryl radical selected from the group consisting of phenyl, tolyl, xylyl, naphthyl or biphenyl and alkyl-substituted derivatives of the same aryl radicals. The reaction can be carried out at a temperature of about 10° C. to about 50° C. with the preferred reaction temperature being from about 20° C. to about 45° C. Generally the reaction time will vary from about 0.5 to about 5 hours or more depending upon the particular reactants and reaction conditions utilized. The reaction proceeds satisfactorily when stoichiometric quantities of the reactants are employed, however, in order to drive the reaction to completion an excess of about 50 to 100 percent or more of the stoichiometric requirement for the azide can be employed, if desired.

When a monohydric alcohol is employed in carrying out the reaction the product, in relatively pure form, is recovered by filtration, decantation, or any other convenient method. The solid product thus obtained is then washed with a large excess of water to remove any alkali metal chloride and unreacted starting materials which may be present, and finally dried in vacuo to yield in nearly a quantitative amount the pure bis(azidodiarylphosphine) decaborane. If the reaction is effected in the presence of a nitrile, the reaction mixture at the conclusion of the reaction is filtered to remove the excess azide together with the alkali metal chloride formed in the reaction. The filtrate is evaporated in vacuo and the residue washed with water to yield the pure bis(azidodiarylphosphine) decaborane product.

The bis(halodiarylphosphine) decaboranes utilized as starting materials in the process of this invention can be prepared by the process set forth in Heying and Schroeder application Serial Number 205,859, filed June 28, 1962. The compound bis(chlorodiphenylphosphine) decaborane is prepared, for example, by reacting a solution of diphenylchlorophosphine in ether with a solution of decaborane in ether and recovering the resulting product from the reaction mixture. Other useful bis(halodiarylphosphine) decaboranes include bis(chlorodiisopropylphosphine) decaborane, bis(chlorodinaphthylphosphine) decaborane, bis(chlorodiethylnaphthylphosphine) decaborane, bis(chlorodibiphenylphosphine) decaborane, bis(chloroditolylphosphine) decaborane, bis(chlorodiisopropyltolylphosphine) decaborane, bis(chlorodi-n-butyltolylphosphine) decaborane, etc. and the corresponding bromine, iodine and fluorine derivatives. Monohydric alcohols suitable as inert organic liquids include, for example, methyl alcohol, ethyl alcohol, n-propyl alcohol, isopropyl alcohol, n-butyl alcohol, t-butyl alcohol, and isoamyl alcohol. Nitriles which can be utilized in the process of this invention include acetonitrile, propionitrile, n-butyronitrile, isobutyronitrile, amylnitrile, etc.

The novel compounds of this invention do not explode on impact or friction but flash on ignition. They are useful for the preparation of valuable linear polymers which are stable at high temperatures and extremely resistant to solvent action and which can be pressure molded to form dimensionally stable shapes. For example, when bis(azidodiphenylphosphine) decaborane is reacted with p-bis(diphenylphosphino) benzene in refluxing benzene, a linear polymer is formed which does not begin to soften until heated to about 340° C. The preparation of such polymers is more fully described in Schroeder application Serial No. 211,869, filed July 23, 1962, for Product and Method.

The following examples illustrate various specific embodiments of this invention and are to be considered not limitative.

EXAMPLE I

Bis(azidodiphenylphosphine) decaborane (I)

A suspension of bis(chlorodiphenylphosphine) decaborane (5.6 g., 0.01 mole) and sodium azide (1.95 g., 0.03 mole) in ethanol (100 ml.) was stirred for 1 hour at 30° C. The solid reaction products were recovered by filtration, washed thoroughly with water (50 ml.) and dried in vacuo over diphosphorus pentoxide. Yield of bis(azidodiphenylphosphine) decaborane: 5.51 g. (96 percent of the theoretical quantity); M.P. 147° C. Recrystallization from ethanol did not raise the melting point.

The analysis of the product was: Calc'd for $C_{24}H_{32}B_{10}N_6P_2$—C, 50.15; H, 5.61; B, 18.83; N, 14.63; P, 10.78. Found: C, 50.88; H, 6.74; B, 17.84; N, 14.60; P, 10.60.

Compound I has the following formula:

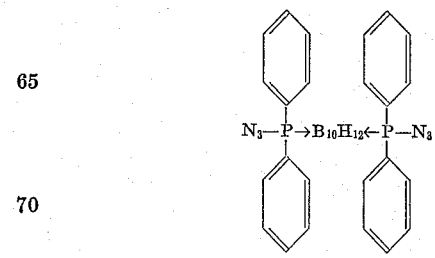

EXAMPLES II–VI

A number of other experiments were performed in the same manner as described in Example I. Pertinent data relating to these experiments are set forth in Table 1 below:

TABLE 1

| Example | Reactor Charge | | | Time (Hr.) | Temp. (° C.) | Yield of Bis (Azidodiphenylphosphine) Decaborane | |
| --- | --- | --- | --- | --- | --- | --- | --- |
| | Bis (Chlorodiphenylphosphine) Decaborane (Mole) | Sodium Azide (Mole) | Ethyl Alcohol (Ml.) | | | (Grams) | (Percent) |
| II | 0.001 | 0.002 | 30 | 1 | 20–40 | 0.53 | 92.5 |
| III | 0.002 | 0.004 | 30 | 1 | 20–40 | 1.03 | 90.0 |
| IV | 0.008 | 0.016 | 130 | 2 | 20–40 | 4.20 | 91.5 |
| V | 0.016 | 0.05 | 300 | 1.5 | 30–40 | 8.80 | 96.0 |
| VI | 0.02 | 0.06 | 300 | 1.5 | 30–40 | 10.90 | 95.0 |

EXAMPLE VII

Acetonitrile (80 ml.) was added to bis(chlorodiphenylphosphine) decaborane (2.8 g., 0.005 mole) and sodium azide (0.98 g., 0.015 mole). The mixture was stirred for 1 hour at 35° C., then filtered to remove the excess sodium azide and the sodium chloride formed in the reaction. The filtrate was evaporated in vacuo and the residue washed with water to give 2.5 g. (90 percent of the theoretical quantity) of crude bis(azidodiphenylphosphine) decaborane, M.P. 144–146° C. The IR spectrum was identical with that of the product of Example I.

EXAMPLE VIII

A mixture of bis(chlorodiphenylphosphine) decaborane (2.8 g., 0.005 mole), sodium azide (0.98 g., 0.015 mole), and methanol (75 ml.) was stirred for 1 hour at 35° C., then filtered. The solid reaction products were thoroughly washed with water and the bis(azidodiphenylphosphine) decaborane remaining was dried in vacuo; yield: 2.6 g. (94 percent of the theoretical quantity of bis(azidodiphenylphosphine) decaborane). The product was identified by its melting point and IR spectrum.

What is claimed is:

1. A bis(azidodiarylphosphine) decaborane of the formula:

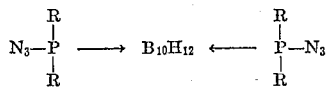

wherein R is aryl selected from the group consisting of phenyl, tolyl, xylyl, naphthyl and biphenyl.

2. Bis(azidodiphenylphosphine) decaborane.

3. A method for the preparation of a bis(azidodiarylphosphine) decaborane of the formula:

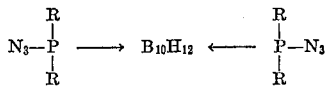

wherein R is aryl selected from the group consisting of phenyl, tolyl, xylyl, naphthyl, and biphenyl, which comprises reacting a bis(halodiarylphosphine) decaborane of the formula:

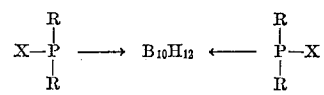

wherein X is a halogen and R is aryl selected from the group consisting of phenyl, tolyl, xylyl, naphthyl, and biphenyl, with an azide of the formula:

$$MN_3$$

wherein M is an alkali metal selected from the group consisting of sodium, potassium and lithium, in the presence of an inert organic liquid.

4. The method of claim 3 wherein the reaction is carried out at a temperature within the range of about 10° C. to about 55° C.

5. The method of claim 3 wherein the said bis(halodiarylphosphine) decaborane is bis(chlorodiphenylphosphine) decaborane.

6. The method of claim 3 wherein the said azide is sodium azide.

7. The method of claim 3 wherein the said inert organic liquid is an alcohol of the formula R'—OH, wherein R' is alkyl having from 1 to 8 carbon atoms.

8. The method of claim 3 wherein the inert organic liquid is ethanol.

9. The method of claim 3 wherein the said inert organic liquid is a nitrile of the formula:

$$R''-CN$$

wherein R'' is alkyl having 1 to 5 carbon atoms.

10. The method of claim 1 wherein the said inert organic liquid is acetonitrile.

11. The method for the preparation of bis(azidodiphenylphosphine) decaborane which comprises reacting bis(chlorodiphenylphosphine) decaborane with sodium azide at a temperature of from about 10° C. to about 55° C. and in the presence of an inert organic liquid.

12. The method of claim 11 wherein the said inert organic liquid is ethanol.

13. The method of claim 11 wherein the said inert organic liquid is acetonitrile.

No references cited.